Sept. 19, 1950     E. J. BURNS     2,522,602
WRITING DESK FOR VEHICLES
Filed Nov. 13, 1947     2 Sheets-Sheet 1

Inventor

Edwin J. Burns

By *Clarence A. O'Brien and Harvey B. Jacobson*
Attorneys

Sept. 19, 1950        E. J. BURNS        2,522,602
WRITING DESK FOR VEHICLES
Filed Nov. 13, 1947        2 Sheets-Sheet 2
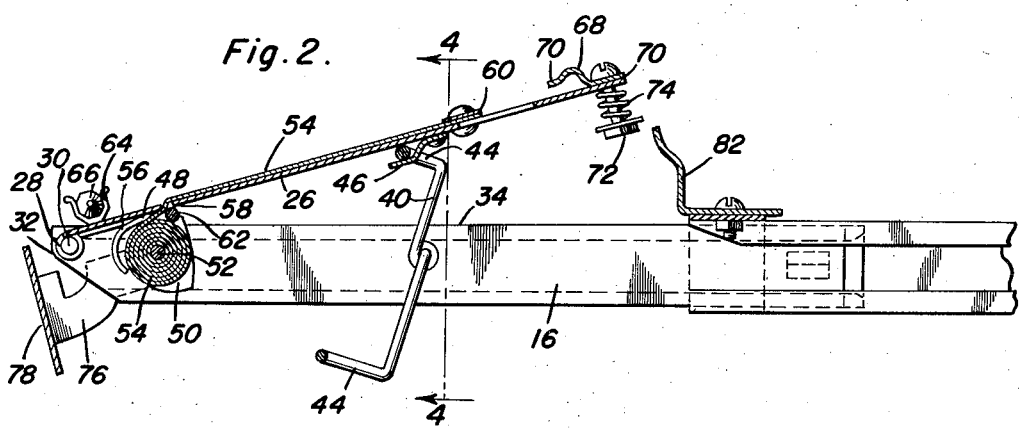
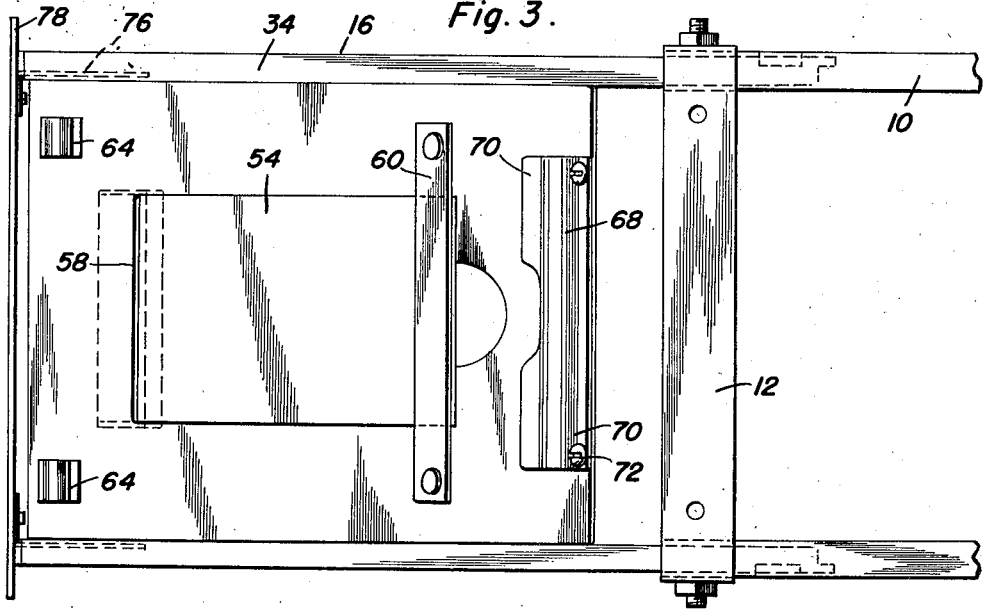
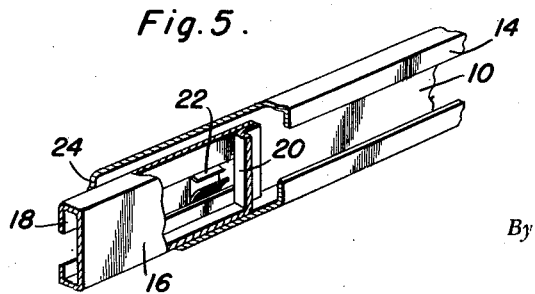
Inventor
Edwin J. Burns
By *Clarence A. O'Brien and Harvey B. Jacobson*
Attorneys Patented Sept. 19, 1950

2,522,602

UNITED STATES PATENT OFFICE 2,522,602

WRITING DESK FOR VEHICLES

Edwin J. Burns, Remington, Ind.

Application November 13, 1947, Serial No. 785,773

8 Claims. (Cl. 281—12)

This invention relates to new and useful improvements in writing desks and the primary object of the present invention is to provide an attachment for the dashboards of vehicles including a slidable frame supporting a pad on which a user may write memorandums and the like.

Another important object of the present invention is to provide a writing desk for vehicles that is small and compact in structure and which is quickly and readily applied to or removed from the dashboard of a vehicle.

Another important object of the invention is to provide a writing desk for vehicles including a pivotal writing panel and novel and improved means for retaining said panel in a raised inclined position.

A further object of the present invention is to provide a writing desk for vehicles including a rotatable paper supporting roller and novel and improved means for guiding and retaining the paper on said roller in position to said desk, facilitating the convenient access thereto by a user.

A still further aim of the present invention is to provide a writing desk for vehicles that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a fragmentary longitudinal vertical sectional view of the present writing desk in an extended position, and showing the writing panel in a raised position;

Figure 3 is a plan view of Figure 2, and showing the vehicle dashboard engaging bracket removed therefrom;

Figure 5 is a fragmentary perspective view of one of the guide tracks used in conjunction with the present invention, and showing one of the slidable arms applied thereto in an extended position, and with parts broken away and shown in section; and, Figure 6 is a fragmentary side elevational view of the slidable frame, and with dotted lines showing the hand receiving panels in a lowered position.

Figure 1:
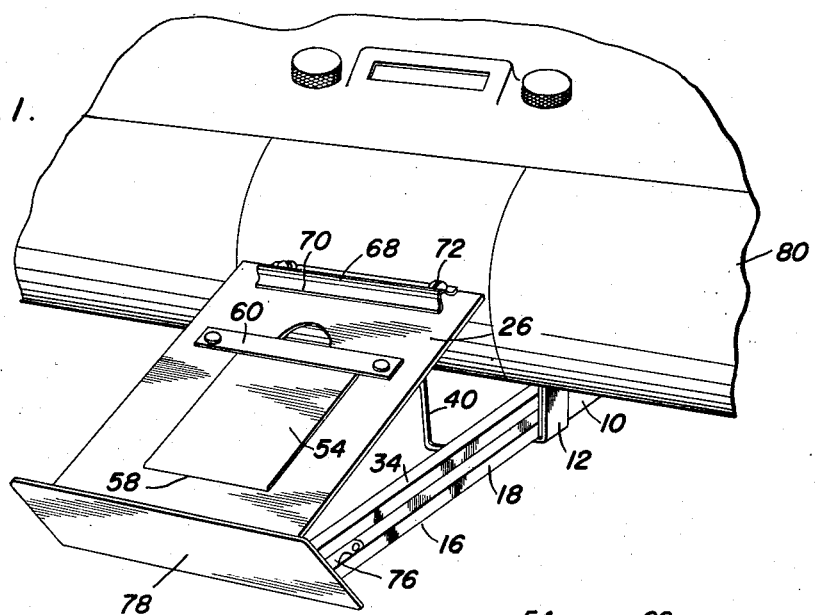
Figure 1 is a fragmentary perspective view of a vehicle dashboard, showing the present invention applied thereto in an extended position, and showing the writing panel supported in a raised position.
Figure 4:
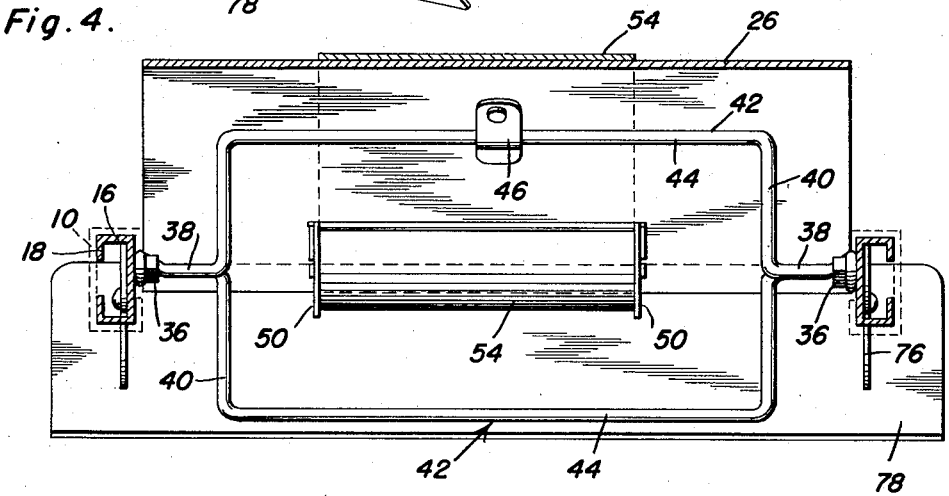
Figure 4 is an enlarged transverse vertical sectional view taken substantially on the plane of section line 4—4 of Figure 2.
Figure 6:
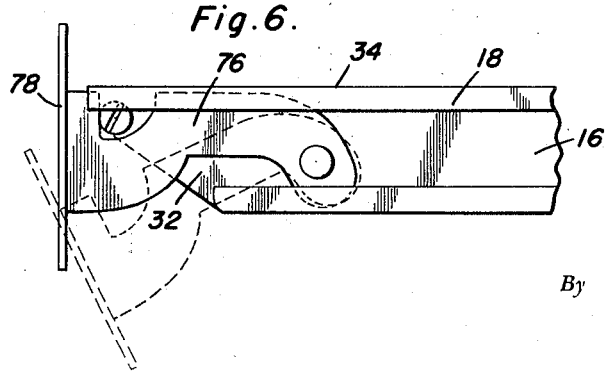

Referring now to the drawings in detail, wherein for the purpose of illustration, there is disclosed a preferred embodiment of the present invention, the numeral 10 represents a pair of spaced parallel, opposing, channel-shaped guide tracks that are retained spaced apart by U-shaped cross members or strap 12. The longitudinal free edges of these guide tracks 10 are turned inwardly to provide retaining flanges 14 that frictionally bear against the web portions of a pair of preferably channel-shaped arms 16, that are slidably mounted in the guide tracks 10. The free longitudinal edges of these arms 16 are also turned inwardly to provide bearing flanges 18 that frictionally bear against the inner faces of the web portions of said guide tracks, thus permitting the sliding movement of the arms 16 relative to the guide tracks without twisting or binding therein.

The rear ends of the arms 16 are provided with closures or stop plates 20 that engage tongues or stops 22 struck inwardly from the web portions of the guide tracks 10, adjacent the forward ends 24 of said guide tracks, to limit the outwardly sliding movement of said arms 16 relative to said guide tracks.

The numeral 26 represents a substantially rectangular writing panel having integral extensions at one end that are bent to form sleeves 28. These sleeves 28 pivotally engage fasteners or pivots 30 that are removably carried by the arms 16 adjacent the forward inclined edges 32 of said arms and adjacent the upper edges 34 of the arms, so that normally the panel 26 will be pivoted to a position spaced inwardly of the edges 34 of the arms, whereby the same may slide beneath the retaining flanges 14 of the guide tracks 10.

Pivotally mounted on fasteners 36 at substantially the center of arms 16, are extensions 38 carried by the side portions 40 of a substantially rectangular support frame 42, having its longitudinal side portions turned outwardly to provide U-shaped portions 44 that engage a spring clip 46 fixed to the lower face of the panel 26, for retaining the panel in a raised and inclined position, as shown best in Figures 1 and 2 of the drawings.

Fixedly secured to the lower face of the panel 26, adjacent the sleeves 28, is a base strip 48 having its end portions turned upwardly to provide a pair of resilient ears or supports 50 that rotatably support a roller 52 having a roll of suitable paper 54 mounted thereon. An integral, arcuate stop finger 56 is carried by the strip 48 and limits the movement of the roller relative to said strip in one direction.

Adjacent the strip 48, is a transverse slit or opening 58 through which the free edge of the paper 54 is extended to bear upon the upper face of the panel. The paper is retained upon the upper face of the panel 26 by engaging a guide strip 60 fixed on the panel and spaced slightly from said panel to accommodate the paper 54. To prevent the paper from tearing in the slit 58, there is provided a guide roller 62 journalled for rotation on the ears 52, adjacent the slit 58.

Rigidly mounted on the upper face of the panel 26, is a pair of spaced, substantially U-shaped spring clips 64 that frictionally support a pencil or the like 66.

The numeral 68 represents an arcuate pad engaging clip having bearing edges 70 that normally bear upon the upper face of the panel 26. One of these edges 70 is secured to the panel 26 by fasteners 72 supporting springs 74 that normally urge the pad 68 upon the panel.

Pivotally mounted on the arms 16, adjacent their forward ends 32, is a pair of outwardly projecting angle members or brackets 76 the free ends of which fixedly engage a preferably flat hand engaging strip or panel 78 that is suitably painted or colored to conform to the appearance of a vehicle dashboard 80.

In practical use of the device, the same is applied to the lower portion 82 of a vehicle dashboard by brackets or the like 12. When it is desirable to use the writing panel 26, by pulling the hand strip 78, the arms 16 will slide outwardly from the guide tracks 10, so that the panel will clear the brackets 12. The panel 26 is then pivoted to an inclined position and by engaging members 44 with clips 46, the panel will remain in this raised position for use.

To replace the paper roller 52, it is merely necessary to pivot the panel outwardly so that its lower face extends upwardly whereby the roller may be repaired or replaced.

It should be noted that the strip 78 being pivoted to the arms 16 permits the same to extend below or beneath the panel 26, thereby facilitating the user to comfortably place his wrist or hand on the panel without engaging the strip 78.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A writing desk for vehicles comprising a pair of guide tracks, means for securing said guide tracks relative to a vehicle dashboard, a frame slidably mounted on said guide tracks, means limiting the movement of said frame in both directions relative to said guide tracks, a panel hingedly carried by said frame, means for retaining said panel in a raised inclined position relative to said frame, a paper supporting roller, means carried by the panel rotatably supporting said roller beneath said panel, guide means carried by said panel for engaging paper on said roller, and means carried by said panel for retaining paper extended from said roller adjacent said panel.

2. The combination of claim 1 wherein said means for retaining said panel in a raised inclined position includes a pivotal support carried by said frame, and a support engaging clip carried by said panel.

3. The combination of claim 1 wherein said means rotatably supporting said roller includes a pair of resilient ears depending from the lower face of said panel.

4. The combination of claim 1 wherein said guide means includes a slot provided in said panel adjacent said roller, and a rotatable guide roller carried by the lower face of said panel adjacent said slot.

5. The combination of claim 1 wherein said frame includes a pivotal hand grip.

6. A writing desk comprising a pair of guide members, means securing said guide members to a structural element, a frame slidably mounted on said guide members, a panel hingedly carried by said frame, a support pivotally mounted on and movable with said frame adapted to retain said panel in a raised and inclined position relative to said frame, and means carried by said plate lockably engaging said support when the panel is raised and inclined.

7. The combination of claim 6 and a pair of brackets pivoted to said frame, and a hand receiving strip fixed to said brackets and movable below the panel when the latter is raised and inclined.

8. A writing desk for vehicles comprising a pair of channel guides adapted to be mounted on a vehicle dash-panel, a pair of channel frame-members slidably received within the guides, tongues struck from the guides, stop plates at the ends of said frame-members for engaging the tongues to limit sliding movement of the frame-members relative to the guides, an elongated panel pivoted at one end to the frame-members, a substantially rectangular support frame journaled for rotation on said frame-members, and resilient means on the under surface of said panel for engaging the frame to retain the panel in an inclined position relative to the frame-members.

EDWIN J. BURNS.

REFERENCES CITED

The following references are of record in the file of this patent:

UNITED STATES PATENTS

| Number | Name | Date |
|--------|------|------|
| 690,842 | Dickey | Jan. 7, 1902 |
| 775,646 | Burks | Nov. 22, 1904 |
| 1,563,864 | Juvet | Dec. 1, 1925 |
| 1,612,258 | Broadvin | Dec. 28, 1926 |
| 2,270,557 | Randall | Jan. 20, 1942 |
| 2,275,060 | Griffin | Mar. 3, 1942 |

FOREIGN PATENTS

| Number | Country | Date |
|--------|---------|------|
| 16,156 of 1915 | Great Britain | Aug. 24, 1916 |